United States Patent
Strahan

(10) Patent No.: US 11,549,827 B1
(45) Date of Patent: Jan. 10, 2023

(54) SYSTEM AND METHOD FOR AUTOMATED CONDITION VALUE REPORTING

(71) Applicant: INFRARED CAMERAS, INC., Beaumont, TX (US)

(72) Inventor: Gary Eugene Strahan, Beaumont, TX (US)

(73) Assignee: INFRARED CAMERAS, INC., Beaumont, TX (US)

( * ) Notice: Subject to any disclaimer, the term of this patent is extended or adjusted under 35 U.S.C. 154(b) by 1107 days.

(21) Appl. No.: 15/634,973

(22) Filed: Jun. 27, 2017

Related U.S. Application Data

(63) Continuation-in-part of application No. 14/194,562, filed on Feb. 28, 2014, now Pat. No. 9,745,059.

(60) Provisional application No. 62/452,970, filed on Jan. 31, 2017.

(51) Int. Cl.
   *G01D 5/26* (2006.01)
   *G01J 5/03* (2022.01)

(52) U.S. Cl.
   CPC . *G01D 5/26* (2013.01); *G01J 5/03* (2022.01)

(58) Field of Classification Search
   CPC ................................. G01D 5/26; G01J 5/26

USPC ................................................. 702/189
   See application file for complete search history.

(56) References Cited

U.S. PATENT DOCUMENTS

| | | | |
|---|---|---|---|
| 4,015,366 A | 4/1977 | Hall, III | |
| 5,637,871 A * | 6/1997 | Piety | G01J 5/02 250/358.1 |
| 6,130,705 A | 10/2000 | Lareau et al. | |
| 7,079,129 B2 | 7/2006 | Shigeta | |
| 8,083,149 B2 * | 12/2011 | Sauerwein, Jr. ... | G06K 7/10722 235/375 |
| 9,612,598 B2 * | 4/2017 | Schultz | B60R 1/00 |
| 2007/0098397 A1 | 5/2007 | Chen et al. | |
| 2008/0079843 A1 | 4/2008 | Pote et al. | |
| 2009/0015674 A1 | 1/2009 | Mley et al. | |
| 2015/0268154 A1 * | 9/2015 | Strahan | G01N 23/00 702/104 |

* cited by examiner

Primary Examiner — Aditya S Bhat

(74) Attorney, Agent, or Firm — Kearney, McWilliams & Davis, PLLC; Dileep P. Rao

(57) ABSTRACT

A system and method usable for receiving data from an optical device and converting the data to a condition value, apply analytical tools to the condition value as determined by the optical device in real time, or substantially real time, analyze data, and generate automated reports in real time, or substantially real time at the location and time that condition values are received.

7 Claims, 1 Drawing Sheet

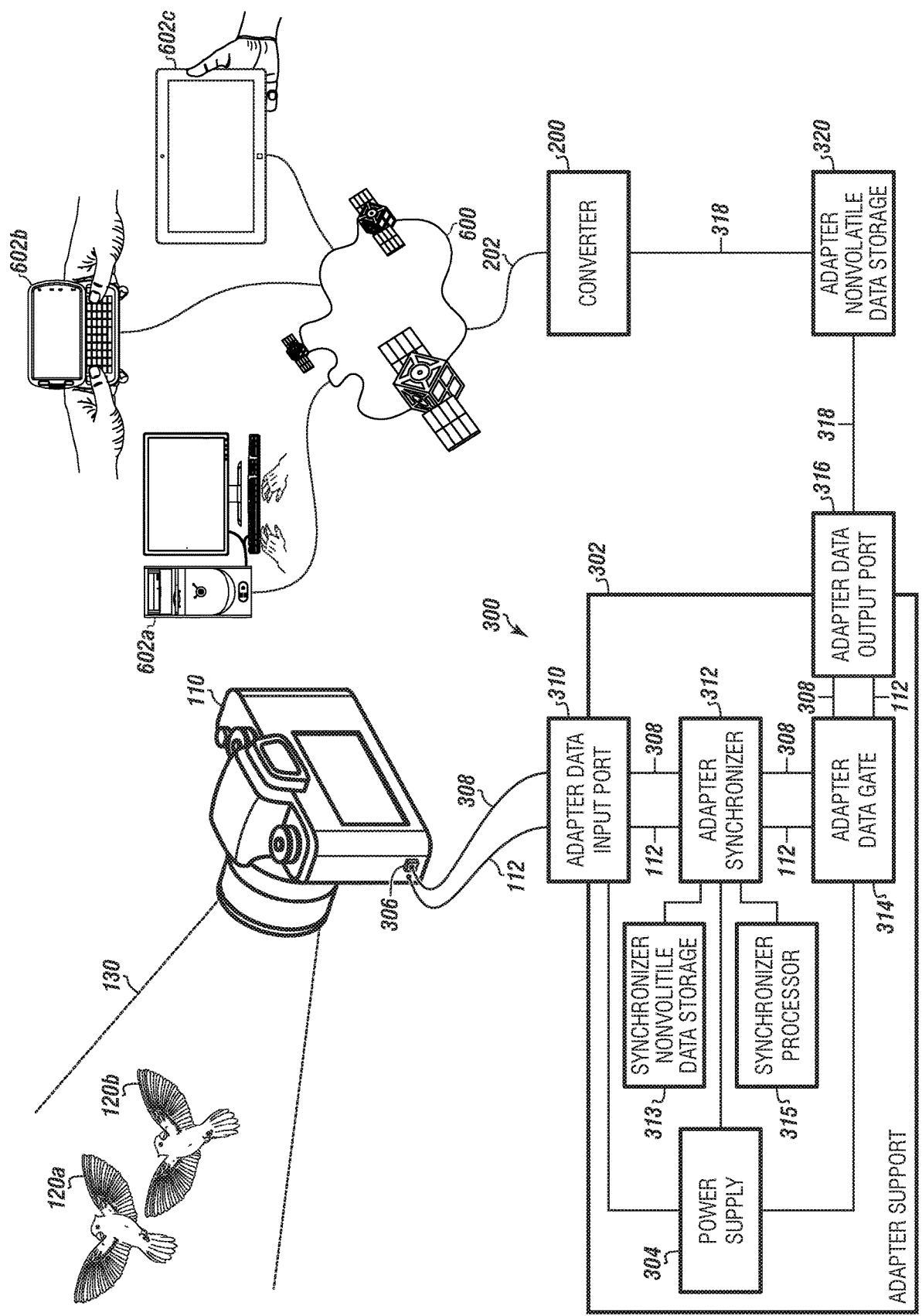

SYSTEM AND METHOD FOR AUTOMATED CONDITION VALUE REPORTING

CROSS REFERENCE TO RELATED APPLICATION

The current application is a Continuation in Part of and claims priority to application Ser. No. 14/194,562 filed on Feb. 28, 2014, titled "System to Adapt an Optical Device to Calculate a Condition Value" now Issued as U.S. Pat. No. 9,745,059 on Aug. 29, 2017. The current application also claims priority to and the benefit of U.S. Provisional Application Ser. No. 62/452,970 filed on Jan. 31, 2017, titled "System and Method for Automated Condition Value Reporting". These references are hereby incorporated in their entirety.

FIELD

The present embodiments generally relate to a system and method for automated reporting from an optical device configured to calculate a condition value such as temperature for objects in the visual field of the optical device.

BACKGROUND

A need exists for a system capable of receiving data from an optical device and converting the data to a condition value. Further, a need exists to apply analytical tools to the condition value as determined by the optical device in real time, or substantially real time. Further, a need exists to analyze data and generate automated reports in real time, or substantially real time at the location and time that condition values are received.

Current optical devices, such as infrared cameras and visible spectrum cameras have various physical structures and data output mechanisms. A need exists for a system that can easily be adapted to interface with multiple types of optical devices to both analyze condition values, as well as generate automated reports.

A further need exists for a system to access the native data of optical devices and calculate pertinent information about conditions in the visual field of the optical device.

Numerous applications spanning multiple industries exist for such a system. For example, temperature distribution analysis of industrial equipment can be conducted to identify potential failures or weak points. Condition values of crops can be analyzed to identify insect intrusion, or diseased plants, plant under or overwatering, and potential crop yield.

Condition values, such as temperatures, can provide invaluable information for analysis in applications spanning multiple industries. A need exists for a lightweight and miniature system capable of being installed on a drone, or unmanned flight vehicle for remote use capable of collecting and supplying condition values. Remote use of such a system allows for rapid data collection, data collection in difficult to reach areas, and data from otherwise impractical perspective views.

However, typical analysis procedures involve capturing data at a single instance of time, and then applying analytical tools to the data at a later time to generate reports with findings. An inability for data analysis and reporting in real time, or substantially real time can lead to inefficiency, greater costs, errors, and omissions in the reporting process.

A need exists, therefore for a system and method to combine various disparate elements of data capture and reporting in order to eliminate the above issues.

The present embodiments meet these needs.

BRIEF DESCRIPTION OF THE DRAWINGS

The detailed description will be better understood in conjunction with the accompanying drawings as follows:

FIG. 1 is a schematic diagram of a system for automated reporting from an optical device configured to calculate a condition value such as temperature for objects in the visual field of the optical device.

The present embodiments are detailed below with reference to the listed Figures.

DETAILED DESCRIPTION OF THE EMBODIMENTS

Before explaining the present system and method in detail, it is to be understood that the system and method is not limited to the particular embodiments and that it can be practiced or carried out in various ways.

Specific structural and functional details disclosed herein are not to be interpreted as limiting, but merely as a basis of the claims and as a representative basis for teaching persons having ordinary skill in the art to variously employ the present invention.

The term "optical device" as used herein refers to a device that detects, manipulates, or measures electromagnetic radiation in a field of vision. The optical device can be capable of outputting data regarding electromagnetic radiation in a field of vision.

The term "field of vision" as used herein refers to an area or volume within which an optical device can detect electromagnetic radiation.

The term "electromagnetic radiation" as used herein refers to radiant energy possessing both a frequency and a wavelength. Examples of electromagnetic radiation include, but are not limited to radio waves, microwaves, infrared radiation, visible light, ultraviolet radiation, x-rays, and gamma rays.

The term "resistive type device (RTD)" or "pixel" as used herein refers to a single component that measures radiant energy carried by electromagnetic radiation and converts the measurement to an electrical signal.

The term "adapter" as used herein refers to a set of components for use with the system of the present invention. The adapter can be an integrated piece, or a collection of individual components. The adapter is intended to refer to a collection of devices that perform the function intended by the present invention.

The term "sensor" as used herein refers to a device that measures one or more variables and converts the measurement to an electrical signal.

The terms "port", "input port", and "output port" as used herein refer to connections for the transfer of analog or digital data. The port can refer to a wireless connection, or a physical connection.

The term "bolometer" as used herein refers to a device for measuring the power of incident electromagnetic radiation.

The term "microbolometer" as used herein refers to a specific type of bolometer that measures electromagnetic radiation in the infrared spectrum.

The term "focal plane array" as used herein refers to a group of RTDs or pixels.

The term "camera" as used herein refers to an optical device that can detect and record electromagnetic radiation in a field of vision. The detected information can be stored, transmitted to another location, or both. A camera can be designed specifically for a specific type of electromagnetic radiation such as infrared radiation, or visible light radiation.

The term "target" as used herein refers to an object or a region within the field of vision of an optical device. The target can be any desired object or region that a user of the present invention wishes to identify a condition value for.

The term "target background" as used herein refers to an object or a region within the field of vision of an optical device that is not the desired object or region that a user of the present invention wishes to identify a condition value for.

The term "condition value" as used herein refers to information about a target that can be extrapolated and calculated using data from an optical instrument and by using other known information. Some examples of condition values include temperature, heat distribution, radioactivity, and any other characteristics of a target that can be calculated using data from an optical instrument.

The term "drone" as used herein refers to an unmanned vehicle that can be operated by remote control. Drone can refer to vehicles with or without flight capability. Drone can also refer to vehicles deployed on or under water.

The term "MIPI Alliance" as used herein refers to a global, collaborative organization comprised of companies that span the mobile ecosystem and are committed to defining and promoting interface specifications for mobile devices. At the time of this writing, the MIPI Alliance maintains a website viewable at www.MIPI.org.

Many optical devices can perceive, record, and transmit data about electromagnetic radiation that is emitted or reflected from an object in their field of vision. The radiation from an object in a field of vision can be translated into data by the optical device. A widely used method for translating detected electromagnetic radiation into data is to use resistive type devices (RTDs), often referred to as pixels.

Many optical devices make use of a bolometer, a device for measuring the power of incident electromagnetic radiation that can include an array of measuring elements. Devices such as infrared cameras can use microbolometers, which are a specific type of bolometer that measure electromagnetic radiation in the infrared spectrum.

As cameras are widely understood examples of optical devices, the embodiments and descriptions below regarding an optical device many times make specific reference to a camera. However, the structural and functional details disclosed herein as well as their usage can be translated to any other optical devices with a field of vision and the capability to transmit or record data, whether or not specifically discussed herein.

In optical devices such as visible light cameras, a focal plane array (FPA) designed for detecting visible light comprising an RTD array can be used. In other cameras, a microbolometer comprising an RTD array for detecting infrared light can be used. The detection mechanism most commonly used is an array of RTDs designed for the specific application. Data from RTDs are referenced in examples, but data from other electromagnetic radiation detection means can be substituted for use with the present invention.

As emitted or reflected radiation from an object is focused on a camera's RTD array (i.e. an FPA or a microbolometer), an electrical signal can be generated by each individual RTD. This electrical signal can be converted to data by the camera. This data can be stored or transmitted by the camera as an optical device data.

By monitoring some additional environmental conditions, the optical device data can be converted to a condition value.

In embodiments, an adapter can be used in conjunction with any optical device with a data output in order to generate a condition value.

The optical device can be modified for automated, real-time reporting from the optical device which is configured to calculate a condition value such as temperature for objects in the visual field of the optical device.

The present embodiments refer to a relate to a system and method for automated reporting from an optical device configured to calculate a condition value such as temperature for objects in the visual field of the optical device. The system can comprise an adapter capable of attaching to an optical device to receive optical device data and communicating the optical device data to a converter. The communication can be direct, such as by wireless transmission of optical device data to the converter, or indirect, such as by storing optical device data for later access by the converter.

A converter can receive the optical device data or the adapter output data and convert the data to a condition value of a target within the field of vision of the optical device. The converter can be a hardware device, such as a PCB with instructions for accomplishing the temperature conversion hard wired in. Or, for greater flexibility, the converter can be implemented using software and a computer.

The converter, when implemented using software, can comprise a computer with a computer data input port, a computer nonvolatile data storage, a computer processor, and a computer data output port. The nonvolatile data storage can comprise a conversion module having computer instructions to convert the output data into a condition value.

The computer nonvolatile data storage can further comprise a calibration module having computer instructions to calibrate the temperature value based upon data from sensors and based upon data from the optical device. For the most accurate condition readings, each optical device can be calibrated with or without an adapter prior to using the optical device in conjunction with the adapter.

Sensors such as a case surface temperature sensor, a lens temperature sensor, a shutter temperature sensor, a detector temperature sensor, an RTD temperature sensor, an ambient air temperature sensor, an air pressure sensor, a relative humidity sensor, a dew point sensor, a precipitation sensor, a wind speed sensor, a wind direction sensor, a cloud cover sensor, and the like can be used. These sensors can aid in calibrating the optical device for the most accurate readings.

An optical device, such as a camera, can be used to output optical device data from its field of vision to a converter. The field of vision can encompass the targets and backgrounds in the controlled environment.

The converter can then fit an algorithm that describes the relationship between any sensor data and the optical device data to the known temperatures of the targets and the known temperatures of the background in the controlled environment.

The algorithm can be specific to the optical device for the greatest accuracy of condition values, in this instance, temperatures. It is feasible to base the algorithm on a similar optical device if a greater error range in calculated condition values is acceptable.

Once an optical device has been calibrated with the converter, the converter can calculate condition values of targets with unknown condition values based upon the generated algorithm and adapter output data received from targets in other fields of vision of the optical device.

Optical devices can output the condition value in a usable manner directly to a display device.

A typical practice has been to record the condition values either continuously, or in a snapshot manner. The data is then transported to another device, such as a personal computer for analysis and report authoring. The present invention simplifies the report authoring process while minimizing cost, time, and errors in reporting.

In one embodiment, the invention can be a system for an optical device to calculate a condition value for a target within a field of vision and automated condition reporting, wherein the system comprises: an optical device which transmits or stores optical device data about the field of vision, a converter which calculates a condition value by accessing the optical device output data or directly receiving the optical device output data and then outputs the condition value, a display device in communication with the converter which displays the condition value and the field of vision in substantially real time, an input device, allowing a user to annotate the displayed data, and a recording device to store annotations and data.

An optical device can transmit data to a converter either directly, or through an adapter. The converter can calculate a condition value as desired and output the data to a display device.

The display device can be any device with computing capability, such as a personal computer, a tablet, a smart phone, and the like. The display device can be in communication with a data storage comprising computer instructions instructing a processor to apply analytical tools as selected by a user in real time, or substantially real time to the condition value or the field of vision displayed.

The analytical tools can be specific to an application as desired by the user. Exemplary analytical tools include: custom, predefined, or mixed color palettes, histogram analysis tools, the ability to mark regions of interest, the ability to display field of view data, the ability to overlay historical data, the ability to apply reference data, and the like.

Based upon a specific application, users can apply various analytical tools to a displayed field of vision. Users can further annotate the field of vision based upon the results of the analysis.

Users can capture still images and video from one or more optical devices and analyze them. A novel aspect of the present invention allows for multiple optical devices measuring the same or different condition values to be analyzed by a user in real time, or substantially real time.

For example, an optical device outputting data from the infrared spectrum can be utilized, and the user can switch to an optical device outputting data from the ultraviolet spectrum. In this manner a multiple analyses can be accomplished by user on disparate sets of data using the system and method of the present disclosure.

Analytical tools can utilize various aspects of machine learning, neural networks, artificial intelligence, and other techniques known to persons having ordinary skill in the art in order to direct the user to perform certain necessary functions.

For example, if a specific field of view is monitored over time, the system can highlight condition values that vary from the historical values. In embodiments, users can select or define a range of acceptable values. When a value is outside the acceptable range, the system can highlight the disparity on the display device.

Further, the utilization of historical data can allow for standardization and continuity of data over periods of time for a specified field of vision or condition value. Overlaying historical data can draw the attention of the user to significant elements for analysis.

An input device, such as a computer mouse, a touch screen, or any other input mechanism known to persons having ordinary skill in the art can be used in conjunction with the display device to allow a user to annotate or otherwise manipulate the data shown on the display device.

A recording device, such as a computer hard drive can be in communication with the display device to receive and store information and data, including raw data and annotated data.

The ability to perform analysis and reporting in real time allows for labor, cost, and time savings. Further, the incorporation of procedural guidelines into the display device, or the analytical tools allows for minimization of errors in analysis and reporting.

Exemplary analytical tools can include: optical device selection, optical device lens selection, optical device calibration, optical device mode selection, data capture modes, condition value selection, field of vision selection, field of vision segmentation, filtering, data interpolation, and the like.

In embodiments, an adapter can be used to translate optical device data for a specific converter, thereby enabling the use of a standard converter for a number of different optical devices.

The system can be applied using a method of determining a condition value within a field of vision and automated condition reporting.

The method can include: determining a condition value, outputting the condition value to a display device, displaying the condition value in substantially real time, providing at least one analysis tool, wherein the at least one analysis tool is manipulatable by a user in substantially real time, providing an input device configured to allow the user to annotate a display on the display device, and generating a report.

Turning now to the FIGURE, FIG. 1 is a schematic diagram of a system for adapting an optical device to calculate a condition value.

In this embodiment, the system can have an optical device 110, wherein the optical device 110 transmits or stores optical device data 112 about a field of vision 130. The optical device 110 can be any device capable of detecting or recording electromagnetic radiation.

Some examples of optical devices 110 usable with the system can include a visible spectrum detector or camera, an infrared detector or camera, an ultraviolet radiation detector or camera, a terahertz camera, a ground penetrating radar device, an x-ray detector or camera, a gamma ray detector or camera, a cosmic ray detector or camera, a microwave detector or camera, a radio wave detector or camera, a lidar detector or camera, and a laser imaging detector or camera.

The field of vision 130 can be the area or volume for which the optical device 110 is detecting or recording electromagnetic radiation. For example, a visible spectrum camera can have a field of vision 130 that encompasses all areas and volumes visible through its lens.

One or more targets 120a and 120b can be within the field of vision. The targets can be any object or area that the optical device 110 can detect or record electromagnetically. The targets 120a and 120b are shown as birds.

The optical device data 112 can be in an analog or digital format, and can comprise information about electromagnetic radiation detected within a field of vision 130. The optical device data 112 can also comprise information from sensors or other components of the optical device 110 capable of transmitting data.

This embodiment shows an adapter 300 in communication with the optical device 110 for receiving the optical device data 112. In embodiments, the adapter is not necessary, and the functions described below can be performed by the optical device.

The adapter can have an adapter support 302. The adapter support can be a flat plate, a circuit board, a housing, or any other structure that allows various adapter components to be supported and in communication with each other.

The adapter 300 can have an adapter power supply 304 connected to the adapter support 302. In alternate embodiments, adapter power can come from an external power supply in communication with the adapter 300.

The adapter 300 can have at least one adapter sensor 306 in communication with the adapter. The embodiment shown has a case surface sensor disposed on the body of the optical device 110. The adapter sensor 306 can be used to collect information about the ambient conditions that the optical device 110 is operating in. This information can be used for calculating a condition value 202 as discussed below.

In embodiments, various other sensors can be used as needed for specific applications. For example, other sensors can be a case surface temperature sensor, a lens temperature sensor, a shutter temperature sensor, a detector temperature sensor, an RTD temperature sensor, an ambient air temperature sensor, an air pressure sensor, a relative humidity sensor, a dew point sensor, a precipitation sensor, a wind speed sensor, a wind direction sensor, a cloud cover sensor, and the like.

The adapter 300 can have at least one adapter data input port 310 connected to the adapter support 302 for receiving the optical device data 112 and receiving the adapter sensor data 308. While the present embodiment shows a single port, multiple input ports can be used for multiple sensors.

The adapter data input port 310 can be various ports in use by optical devices. Based upon the type of data transmitted by the optical device 110, the data input port 310 can be a parallel port or a serial port. As to form factor, the adapter data input port 310 can be any form used by an optical device.

In embodiments, various ports can be used such as: a wireless port, a camera serial interface port, a camera parallel interface port, an Ethernet port, a port complying with IEEE 1394 standards, a port complying with IEEE 1284 standards, a PS/2 port, a port complying with RS-232 standards, a universal serial bus (USB)) port, a video graphics array (VGA) port, a digital visual interface (DVI) port, a small computer system interface (SCSI) port, a high-definition multimedia interface (HDMI) port, a tip/ring/sleeve (TRS) port, and the like.

In embodiments, the adapter 300 can comprise an adapter synchronizer 312 connected to the adapter support 302 for synchronizing the adapter sensor data 308 with the optical device data 112. The adapter synchronizer 312 can ensure that data received from the optical device 110 and the adapter sensor 306 are not time shifted with respect to each other.

The adapter synchronizer 312 can be any means of time synchronizing data, for example: a circuit board with a hardwired instruction, an electronic component for selectively delaying certain data, computer instructions in a synchronizer nonvolatile data storage 313 instructing a synchronizer processor 315 to correlate the adapter sensor data 308 with the optical device data 112 using a time identifier of the adapter sensor data 308 and a time identifier of the optical device data 112, or other similar mechanisms.

The adapter 300 can have an adapter data gate 314 in communication with the adapter data input port 310. The adapter data gate 314 can combine the optical device data 112 and the adapter sensor data 308, or simply throughput the optical device data 112 and the adapter sensor data 308.

The adapter data gate 314 is shown simply throughputting the optical device data 112 and the adapter sensor data 308.

The adapter 300 can have at least one adapter data output port 316 connected to the adapter support 302 for transmitting an adapter output data 318 to an adapter nonvolatile data storage 320 or to a converter 200. The adapter output data can comprise the adapter sensor data 308 and the optical device data 112.

The adapter data output port 316 can be of any desired form factor. Various ports, as discussed for the adapter data input port 310 can be used as desired.

The adapter output data is shown in this embodiment being output to an adapter nonvolatile data storage 320. In other embodiments, the adapter output data can be directly transmitted to the converter 200.

The system can have a converter 200, wherein the converter calculates a condition value 202 and outputs the condition value 202. The converter can simultaneously output the condition value 202 to a plurality of locations 602a-602c, such as a display, a client device, a printer, a nonvolatile data storage, an application programming interface, and the like.

Examples shown in this FIGURE include an application programming interface 602a for a program residing on a computer, a client device such as a cellular phone 602b, and a client device such as a tablet computer 602c. The devices 602a-602c can comprise analytical tools (as computer executed functions) as discussed above to analyze condition values or field of vision data in real time or substantially real time. The devices 602a-602c can further comprise an input device for annotation or other manipulation of optical device data.

The converter can output the condition value 202 directly to a location, or via a network 600.

In the embodiment shown, the converter accesses the adapter output data 318 from the adapter nonvolatile data storage 320. In alternative embodiments, the converter can directly receive the adapter output data 318 from the adapter 300, for example using a wireless connection.

In alternative embodiments, the adapter nonvolatile data storage 320 can also be connected to the adapter support 302.

While the invention has been described with emphasis on the embodiments, it should be understood that within the scope of the appended claims, the invention might be practiced other than as specifically described herein.

What is claimed is:

1. A system for an optical device to calculate a condition value for a target within a field of vision and automated real-time condition analysis and reporting, wherein the system comprises:
   a an optical device, wherein the optical device transmits or stores optical device data about the field of vision;
   b a converter, wherein the converter:
      i calculates a condition value by at least one of:
         (1) accessing the optical device data; and
         (2) directly receiving the optical device data; and
      ii outputs the condition value;
   c a display device in communication with the converter, wherein the display device displays the condition value, the field of vision, or both the condition value and the field of vision in real time, wherein the display device is configured to display the field of vision as a thermographic image or a visible image;
d an input device configured to allow a user to annotate both the condition value and the field of vision thereby creating a simultaneously annotated condition value and annotated field of vision; and
e a recording device to store the raw condition value, the raw field of vision, annotated condition value, the annotated field of vision, or any combination thereof.

2. The system of claim 1, wherein the display device is in electronic communication with a data storage comprising computer instructions instructing a processor to apply analytical tools as selected by a user in real time to the condition value or the field of vision displayed.

3. The system of claim 2, wherein the analytical tools comprise:
a custom, predefined, or mixed color palettes;
b histogram analysis tools;
c displaying regions of interest;
d displaying field of view data;
e overlaying historical data; or
f displaying reference data.

4. The system of claim 2, wherein the recording device is further in communication with a data storage to electronically store the annotated condition value, the annotated field of vision, or both the annotated condition value and the annotated field of vision, and further wherein the data storage comprises historical data.

5. The system of claim 1, wherein a second optical device and a second converter are in communication with the display device, allowing the display device to display a second condition value, a second field of vision, or both the second condition value and the second field of vision in real time.

6. A system for adapting an optical device to calculate a condition value for a target within a field of vision and automated real-time condition analysis and reporting, wherein the system comprises:
a an optical device, wherein the optical device transmits or stores optical device data about the field of vision;
b an adapter in communication with the optical device for receiving the optical device data;
c a converter, wherein the converter:
i calculates a condition value by at least one of:
(1) accessing the optical device data; and
(2) directly receiving the optical device data; and
ii outputs the condition value;
d a display device in communication with the converter, wherein the display device displays the condition value, the field of vision, or both the condition value and the field of vision in real time;
e an input device configured to allow a user to annotate both the condition value and the field of vision thereby creating a simultaneously annotated condition value and annotated field of vision; and
f a recording device to store the annotated condition value, the annotated field of vision, or both the annotated condition value and the annotated field of vision.

7. A method of determining a condition value within a field of vision and automated real-time condition analysis and reporting comprising:
a determining a condition value;
b outputting the condition value to a display device;
c displaying the condition value, the field of vision, or both the condition value and the field of vision in real time;
d providing at least one analysis tool, wherein the at least one analysis tool is manipulatable by a user in real time;
e providing an input device configured to allow the user to annotate both the condition value and the field of vision thereby creating a simultaneously annotated condition value and annotated field of vision; and
f generating a report.

* * * * *